(12) United States Patent
Ochiai

(10) Patent No.: US 11,432,376 B2
(45) Date of Patent: Aug. 30, 2022

(54) HEATING DEVICE

(71) Applicant: NIFCO INC., Yokosuka (JP)

(72) Inventor: Hiroshi Ochiai, Yokosuka (JP)

(73) Assignee: NIFCO INC., Yokosuka (JP)

( * ) Notice: Subject to any disclaimer, the term of this patent is extended or adjusted under 35 U.S.C. 154(b) by 165 days.

(21) Appl. No.: 16/871,154

(22) Filed: May 11, 2020

(65) Prior Publication Data

US 2020/0275533 A1    Aug. 27, 2020

Related U.S. Application Data

(63) Continuation of application No. PCT/JP2018/042229, filed on Nov. 15, 2018.

(30) Foreign Application Priority Data

Nov. 20, 2017  (JP) .............................. JP2017-222881

(51) Int. Cl.
  *H05B 3/84*   (2006.01)
  *G03B 17/55*  (2021.01)
  *B60R 11/04*  (2006.01)

(52) U.S. Cl.
  CPC .............. *H05B 3/84* (2013.01); *G03B 17/55* (2013.01); *B60R 11/04* (2013.01); *H05B 2203/02* (2013.01)

(58) Field of Classification Search
  CPC ................................... H05B 3/84; G03B 17/55
  USPC ....................................................... 348/148
  See application file for complete search history.

(56) References Cited

U.S. PATENT DOCUMENTS

| 2017/0010616 A1 | 1/2017 | Shashua et al. |
| 2017/0205625 A1 | 7/2017 | Wehninck |

FOREIGN PATENT DOCUMENTS

| JP | 10-109587 A | 4/1998 |
| JP | 11-245772 A | 9/1999 |
| JP | 2000-177381 A | 6/2000 |
| JP | 2006-56413 A | 3/2006 |
| JP | 2006-151200 A | 6/2006 |
| JP | 2010-160954 A | 7/2010 |
| JP | 2015-76227 A | 4/2015 |
| JP | 2017-061317 A | 3/2017 |
| JP | WO 2017/163892 A1 | 9/2017 |

(Continued)

OTHER PUBLICATIONS

JP2010160954 Machine Translation (Year: 2010).*

(Continued)

*Primary Examiner* — Nguyen T Truong
(74) *Attorney, Agent, or Firm* — Oblon, McClelland, Maier & Neustadt, L.L.P.

(57) ABSTRACT

A heating device for off-vehicle information acquisition means, which has high heating efficiency, which is thin, and which has a high degree of freedom for layout of a heating element is provided.

A heating device (100), which is arranged inside a vehicle, heats a window glass portion (Wa) located in an information acquisition path (5) of an off-vehicle information acquisition means (50) for acquiring information outside the vehicle. The heating device (100) comprises a hood (10) provided inside the vehicle below the information acquisition path (5) of the off-vehicle information acquisition means (50) and a heating element (20) provided on the surface of the hood (10) or inside the hood (10) and having a PTC heater layer (21).

5 Claims, 6 Drawing Sheets

(56) References Cited

FOREIGN PATENT DOCUMENTS

| | | |
|---|---|---|
| KR | 10-2014-0020091 A | 2/2014 |
| KR | 10-2014-0123985 A | 10/2014 |
| KR | 10-2017-0096189 A | 8/2017 |
| KR | 10-2017-0114956 A | 10/2017 |
| WO | WO 2016/105674 A1 | 6/2016 |
| WO | WO 2016/145431 A1 | 9/2016 |
| WO | WO 2017/151348 A1 | 9/2017 |

OTHER PUBLICATIONS

Japanese Office Action dated Feb. 12, 2021 in Japanese Patent Application No. 2017-222881, 7 pages.
International Preliminary Report on Patentability and Written Opinion dated Jun. 4, 2020 in PCT/JP2018/042229 (English Translation only), 15 pages.
International Search Report dated Dec. 25, 2018 in PCT/JP2018/042229 filed on Nov. 15, 2018, 1 page.
Japanese Office Action dated Apr. 28, 2020 in Japanese Application 2017-222881 (with English Translation), 10 pages.
Korean Office Action dated May 27, 2020 in Korean Patent Application No. 10-2018-0130110, 4 pages.
Reconsideration Report dated Sep. 24, 2021 in corresponding Japanese Patent Application No. 2017-222881, 8 pages.
Japanese Office Action dated Aug. 11, 2020 in Patent Application No. 2017-222881, 5 pages.
Office Action dated May 13, 2022, in Japanese Patent Application No. 2017-2223381.

\* cited by examiner

HEATING DEVICE

CROSS-REFERENCE TO RELATED APPLICATIONS

This application is a continuation application of International Application No. PCT/JP 2018/42229, filed on Nov. 15, 2018, which claims the benefit of priority from Japanese Patent Application No. 2017-222881, filed on Nov. 20, 2017. The entire contents of these applications are incorporated herein by reference.

BACKGROUND OF THE INVENTION

Field of the Invention

The present invention relates to a heating device which is arranged inside a vehicle and which heats a window glass portion. The window glass portion is located in an information acquisition path of an off-vehicle information acquisition means acquiring information outside the vehicle.

Background Art

An in-vehicle camera device is an example of an off-vehicle information acquisition device arranged inside a vehicle and acquiring information outside the vehicle. As such an in-vehicle camera device, the in-vehicle camera device having a heating device is known (see Patent Document 1). The heating device heats a window glass portion located in viewing field of the in-vehicle camera. The heating device prevents the window glass portion from being clouded by condensation or the like. The heating device includes, for example, a hood ("baffle plate" in Patent Document 1) and a heating element attached to the hood. The heating device heats the window glass portion by thermal energy radiated from the heating element.

The heating element is provided, for example, on a lower surface of the hood. The lower surface of the hood is on the opposite side of a surface of the hood facing the window glass portion. When the entire hood is heated by the heating element, thermal energy is radiated from an upper surface of the hood. The thermal energy heats the window glass portion. In short, the thermal energy generated at the lower surface of the hood is transferred from the upper surface of the hood to the window glass portion through the heat transfer of the hood. The heating element is, for example, a hot wire or a conductive coating layer, and generates heat by utilizing supplied electric current.

However, since the heating efficiency of the hot wire and the conductive coating layer is not so high, further improvement in the heating efficiency is desired. Further, in such a heating device, it is necessary to provide a heat insulating sheet between the high-temperature heating element and the in-vehicle camera in order to arrange the high-temperature heating element and the in-vehicle camera adjacent to each other. Therefore, it is difficult to reduce the thickness of the heating device. Further, the conventional heating device has a temperature fuse for providing a fail-safe function for preventing overheating. Since the thermal fuse must be arranged so as to be in close contact with the heating element, the degree of freedom of layout of the heating element is low.

PRIOR ART DOCUMENTS

Patent Documents

[Patent Document 1] JP201761317A1

SUMMARY OF THE INVENTION

The present invention was created in consideration of the above situation. An object of the present invention is to provide a heating device for off-vehicle information acquisition means, which has high heating efficiency, which is thin, and which has a high degree of freedom for layout of a heating element.

The present invention is a heating device arranged inside a vehicle and heating a window glass portion, the window glass portion being located in an information acquisition path of an off-vehicle information acquisition means acquiring information outside the vehicle, the heating device comprising:

a hood provided inside the vehicle below the information acquisition path of the off-vehicle information acquisition means; and a heating element provided on the surface of the hood or inside the hood and having a PTC heater.

According to the present invention, the PTC heater autonomously maintains the amount of heat generation in a certain range by an autonomous temperature control function. Therefore, the heating efficiency is high. Further, even if there is no fail-safe means using a temperature fuse or a temperature sensor, the heating element 20 can be prevented from overheating. Therefore, according to the present invention, it is possible to provide the heating device, used for the off-vehicle information acquisition means, which has a high heating efficiency, which is thin, and which has a high degree of freedom for layout of the heater.

The hood may have an upper surface facing the window glass portion, and the heating element may be provided on the upper surface of the hood.

In this case, the window glass portion can be directly heated without utilizing the heat transfer in the hood. Therefore, a desired temperature of the heating element is lower than in the conventional case. Therefore, the heating device having a higher heating efficiency can be provided.

The heating device may further comprise a low reflection film provided on the upper surface of the hood so as to cover the heating element. In this case, the heating element and the upper surface of the hood are prevented from being reflected on the window glass portion. Therefore, the information acquisition path of the off-vehicle information acquisition means can be maintained in a clear state.

The color of the low reflection film may be black. In this case, the heating element and the upper surface of the hood certainly are prevented from being reflected on the window glass portion. Therefore, the information acquisition path of the off-vehicle information acquisition means can be maintained further in a clear state.

Alternatively, the hood may have a lower surface opposite to a surface of the hood facing the window glass portion, and the heating element may be provided on the lower surface of the hood.

If the heating element is provided on the lower surface of the hood, an antireflection film for preventing the heating element from being reflected on the window glass portion is unnecessary. Therefore, the structure of the heating device can be further simplified.

The heating element may be in contact with the surface of the hood. For example, the heating element and the hood may be integrally formed by insert molding. In this case, the number of steps required for attaching the heating element to the hood can be reduced as compared with the case where the heating element is attached to the hood by an adhesive, for example. Further, according to the insert molding, it is easy to attach the heating element to the hood having various shapes. Therefore, the degree of freedom for designing the hood is high.

The heating element may comprise a film substrate and a PTC heater layer laminated on the film substrate, and the PTC heater layer may comprise a polymer and conductive particles dispersed in the polymer. For example, the heating element may be formed into a film by printing ink having PTC characteristics on the film substrate. In this case, the degree of freedom for designing a pattern of the heater is high.

In the present invention as described above, an in-vehicle camera or an in-vehicle radar can be adopted as the off-vehicle information acquisition means.

An off-vehicle information acquisition device comprising the aforementioned heating device and an off-vehicle information acquisition means provided on the heating device is also within the scope of the present invention.

According to the present invention, it is possible to provide the off-vehicle information acquisition device that has high heating efficiency and does not require a heat insulating sheet. Alternatively, according to the present invention, it is possible to provide the off-vehicle information acquisition device that has a high heating efficiency, that is thin, and that has a high degree of freedom for layout of the heater.

According to the present invention, it is possible to provide a heating device, used for an off-vehicle information acquisition means, that has a high heating efficiency, that is thin, and that has a high degree of freedom for layout of the heater.

DETAILED DESCRIPTION OF THE INVENTION

One embodiment of the present invention will be described in detail below with reference to the accompanying drawings. Here, an example in which the in-vehicle camera 50 constitutes the off-vehicle information acquisition means will be described. Therefore, the information acquisition path of the off-vehicle information acquisition means is the viewing field 5 of the in-vehicle camera 50.

Figure 1:
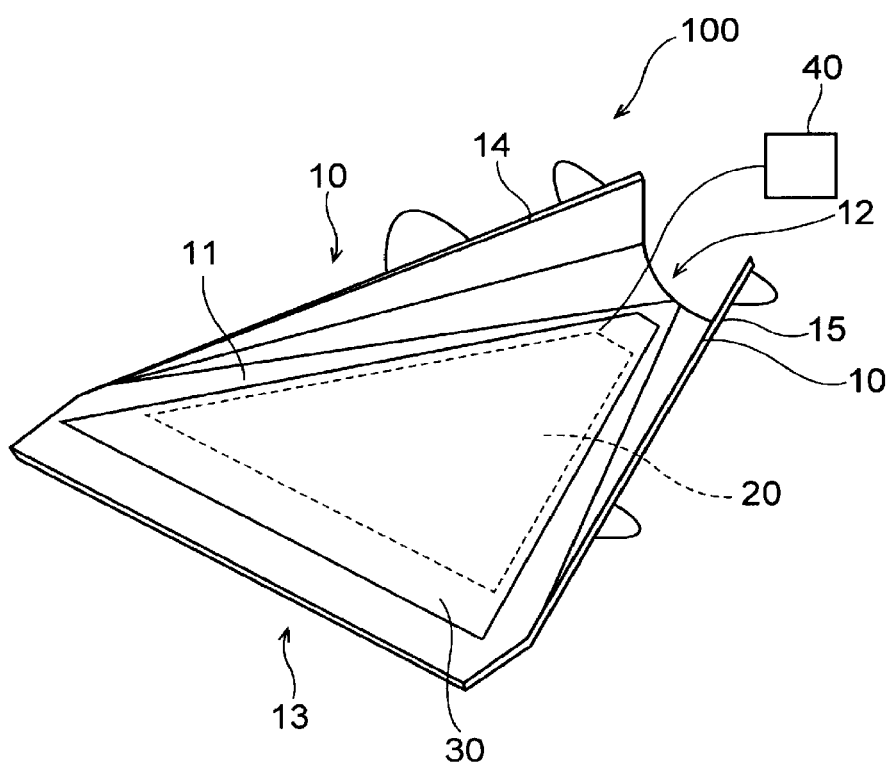
FIG. 1 is a schematic perspective view of a heating device according to an embodiment of the present invention.
Figure 2:
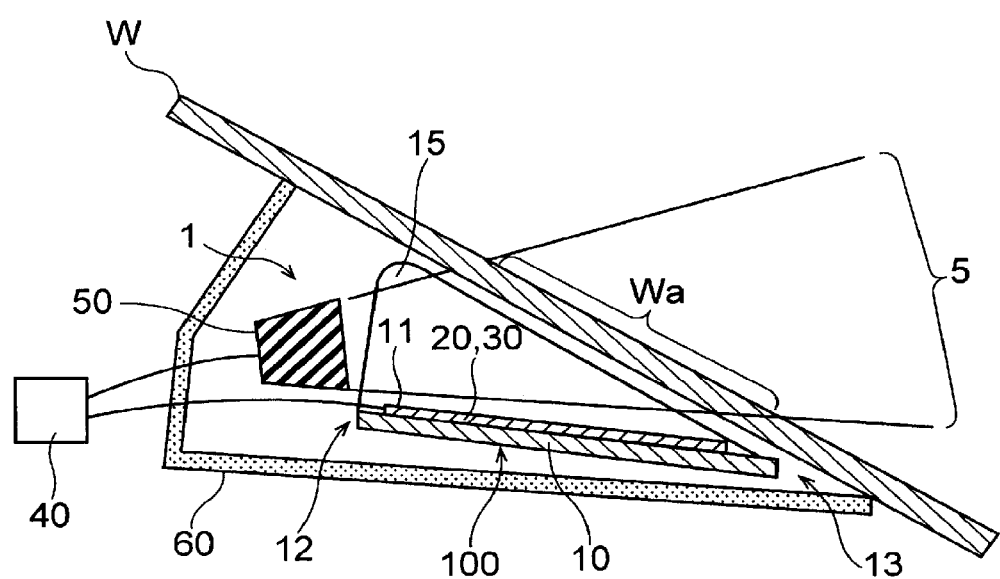
FIG. 2 is a schematic cross-sectional view of an in-vehicle camera device having the heating device shown in FIG. 1. The in-vehicle camera device is mounted on the window glass inside the vehicle.

FIG. 1 is a schematic perspective view of a heating device 100 according to an embodiment of the present invention. FIG. 2 is a schematic cross-sectional view of an in-vehicle camera device 1 having the heating device 100 shown in FIG. 1. The in-vehicle camera device is mounted on the window glass W inside the vehicle.

The heating device 100 according to the present embodiment is a component of the in-vehicle camera device 1. As shown in FIG. 1, the heating device 100 includes a hood 10 having an upper surface 11 facing the window glass portion Wa, and a heating element 20 provided on the upper surface 11 of the hood 10 and having a PTC heater. On the upper surface of the heating element 20, a low reflection film 30 having black color is adhered. The low reflection film 30 can suppress the heating element 20 and the upper surface 11 of the hood 10 from being reflected on the window glass portion Wa.

As shown in FIG. 2, the in-vehicle camera device 1 includes the heating device 100 and an in-vehicle camera 50. The in-vehicle camera device 1 is supported by a support body 60 fixed to the window glass W inside the vehicle so that an image outside the vehicle can be taken through the window glass W. The heating device 100 is provided below the viewing field 5 of the in-vehicle camera 50. The heating device 100 heats the window glass portion Wa located in the viewing field 5 of the in-vehicle camera 50 disposed inside the vehicle.

Figure 3:
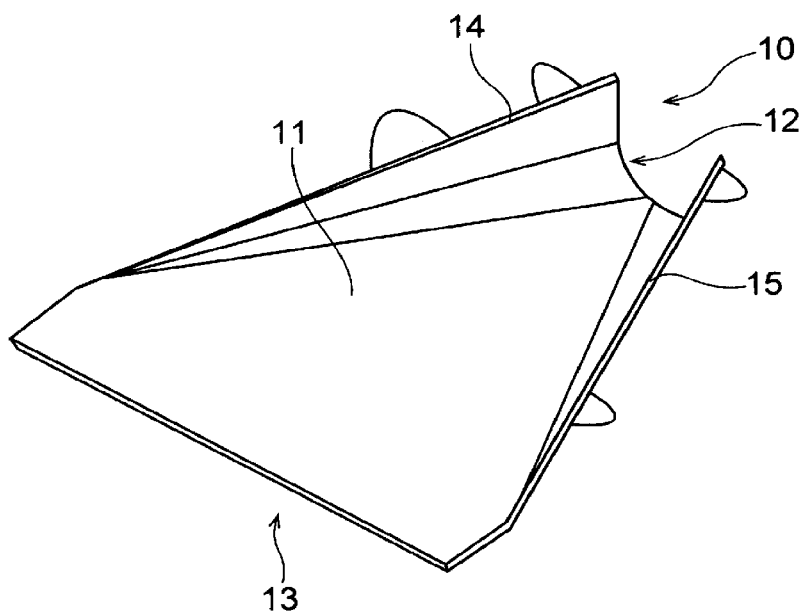
FIG. 3 is a schematic perspective view of the hood shown in FIG. 1.

FIG. 3 is a schematic perspective view of the hood 10 shown FIG. 1. The hood 10 is made of resin, for example. The hood 10 can prevent the viewing field 5 from being obstructed by an undesirable reflection of a part of the interior of the vehicle on the window glass portion Wa located in the viewing field 5 of the in-vehicle camera 50. As shown in FIG. 3, the hood 10 has approximately a fan-like shape that gradually becomes wider from the base end 12 (the upper right end in FIG. 3) toward the tip end 13 (the lower left end in FIG. 3) when viewed from above. The base end 12 is an end of the hood 10 on the in-vehicle camera 50 side. Tip end 13 is an end of the hood 10 on the opposite side of the base end 12. Further, as shown in FIG. 3, the hood 10 has side walls 14 and 15 that rise upward from both sides of the upper surface 11. These side walls 14 and 15 shield light incident from the side of the hood 10 toward the window glass portion Wa located in the viewing field 5 of the in-vehicle camera 50.

The heating device 100 is arranged such that the upper surface 11 forms an acute angle with respect to the window glass W (see FIG. 2). Accordingly, the separation distance from the upper surface 11 of the hood 10 to the window glass W gradually decreases from the base end 12 to the tip end 13 of the hood 10. In order to accommodate such a separation distance, as shown in the figure, the height of the upward rise of the side walls 14 and 15 gradually decreases from the base end 12 toward the tip end 13 of the hood 10. The side walls 14 and 15 substantially disappear at the tip end 13.

Figure 4:
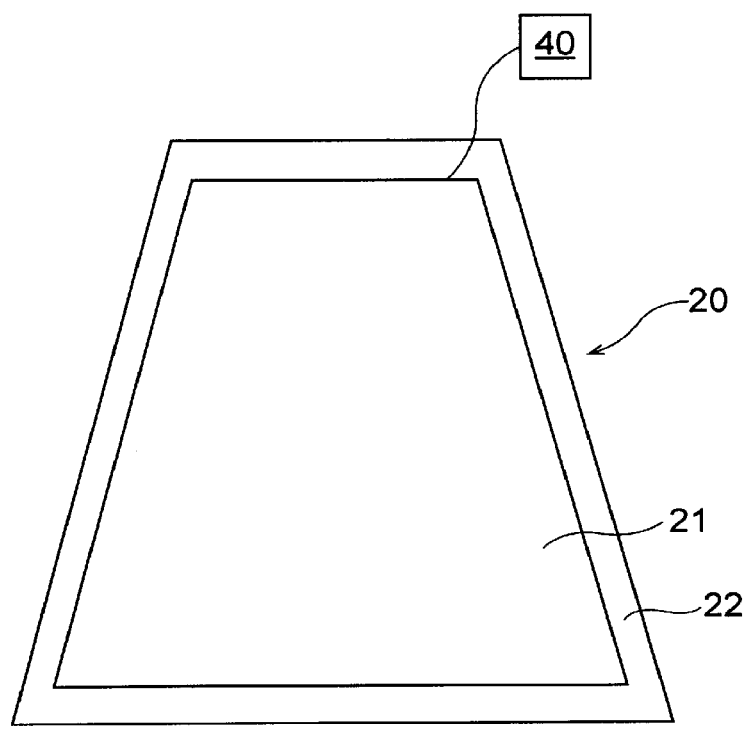
FIG. 4 is a schematic bottom view of the heating element shown in FIG. 1.

FIG. 4 is a schematic bottom view of the heating element 20 shown FIG. 1. The heating element 20 in FIG. 4 is illustrated so that a portion (lower portion) facing the upper surface 11 of the hood 10 is shown in front. As shown in FIG. 4, the heating element 20 includes a film substrate 22 and a PTC heater layer 21 laminated on the film substrate 22.

The film substrate 22 is a film containing a resin such as polyethylene. The PTC heater layer 21 is a layer of a heating element having an autonomous temperature control function. The PTC heater layer 21 is composed of a polymer having a low melting point and conductive particles such as carbon black and nickel dispersed in the polymer. Such a film-like heating element 20 may be produced, for example, by printing PTC ink containing a low melting point polymer and conductive particles onto a film substrate 22 using a suitable printing device (not shown). In this embodiment, the film-like heating element 20 manufactured in this manner is integrated with the hood 10 by insert molding without using an adhesive layer (See FIG. 1). That is, the heating element 20 is in contact with the surface of the hood 10. In particular, the film substrate 22 of the heating element 20 is in contact with the upper surface 11 of the hood 10.

As shown in FIGS. 1 2, and 4, the PTC heater layer 21 of the heating element 20 is connected to a control unit 40. The control unit 40 controls the PTC heater layer 21. The PTC heater layer 21 has the autonomous temperature control function. Therefore, the control unit 40 have only to have a function as a switch for starting and stopping the power supply to the PTC heater layer 21. As shown in FIG. 2, the control unit 40 of the present embodiment is also connected to the in-vehicle camera 50. The control unit 40 activates the PTC heater layer 21 with the activation of the in-vehicle camera 50 as a trigger. The control unit 40 may further include a sensor for detecting the temperature and/or humidity inside and outside the vehicle, and a determination unit for determining whether there is a risk of clouding of the window glass portion Wa based on the sensor. In this case, the PTC heater layer 21 may be activated when the control unit 40 determines that clouding may occur in the window glass portion Wa based on the detection value of the sensor.

Next, the operation of the heating device 100 will be described.

When the vehicle equipped with the in-vehicle camera device 1 is started, the in-vehicle camera 50 is activated. Triggered by this activation, the control unit 40 starts the power supply to the PTC heater layer 21 of the heating element 20. As a result, the PTC heater layer 21 generates heat, and the PTC heater layer 21 radiates thermal energy. The thermal energy directly heats the window glass portion Wa located in the viewing field 5 of the in-vehicle camera 50. That is, the thermal energy heats the window glass portion Wa without utilizing the heat transfer in the hood 10. As a result, clouding due to condensation and frost adhesion is suppressed in the window glass portion Wa.

When the temperature of the PTC heater layer 21 rises to a certain level, the polymer begins to melt. As a result, the mutual contact between the conductive particles dispersed in the polymer starts to break. The conductive particles are made of carbon black, nickel or the like. The breaking becomes more pronounced as the degree of melting of the polymer increases. That is, as the temperature of the PTC heater layer 21 increases, the electric resistance of the PTC heater layer 21 increases. Therefore, the current flowing through the PTC heater layer 21 is reduced. As a result, the amount of heat generation in the PTC heater layer 21 is reduced and the temperature is lowered. When the temperature is lowered to a certain level, the molten polymer solidifies again to restore contact between the conductive particles. Then, the electric resistance of the PTC heater layer 21 decreases. Therefore, the current flowing through the PTC heater layer 21 increases. As a result, the heat generation in the PTC heater layer increases. This causes the temperature to rise again. The PTC heater layer 21 autonomously repeats the above described series of temperature increases and decreases. Therefore, the PTC heater layer 21 maintains a substantially constant temperature range without being subjected to special temperature control.

According to the present embodiment as described above, the PTC heater layer 21 autonomously maintains the amount of heat generation in a certain range by the autonomous temperature control function. Therefore, the heating efficiency is high. Further, even if there is no fail-safe means using a temperature fuse or a temperature sensor, the heating element 20 can be prevented from overheating. Therefore, according to the present embodiment, it is possible to provide the heating device 100 and the in-vehicle camera device 1 which have high heating efficiency, which are thin, and which have a high degree of freedom for layout of the heating element 20.

The hood 10 has the upper surface 11 facing the window glass portion Wa, and the heating element 20 is provided on the upper surface 11 of the hood 10. Therefore, the window glass portion Wa can be directly heated without utilizing the heat transfer in the hood 10. Therefore, a desired temperature of the heating element 20 is lower than in the conventional case. Accordingly, the heating device 100 having a higher heating efficiency can be provided.

The heating device 100 has a low reflection film having black color and provided on the upper surface of the hood 10 so as to cover the heating element 20. Therefore, it is effectively avoided that the heating element 20 and the upper surface 11 of the hood 10 are reflected on the windshield portion Wa. As a result, the viewing field 5 of the in-vehicle camera 50 can be maintained favorably.

The heating element 20 of the present embodiment is integrally formed with the hood 10 by insert molding. Therefore, a step of attaching the heating element 20 to the hood 10 with an adhesive is unnecessary. This eliminates the need for burdensome operations for adhesion including alignment and uniform pressurization, thereby reducing the number of steps required to attach the heating element 20 to the hood 10. Further, according to the insert molding, even when the hood 10 is formed in a complicated shape, it is easy to integrate the heating element 20 into the hood 10. Therefore, the hood 10 has a high degree of freedom for its shape.

Further, the heating element 20 is formed into a film by printing ink having PTC characteristics on the film substrate 22. Therefore, the degree of freedom for designing the heater pattern is high. Further, it is easy to handle the heating element 20 when the hood 10 and the heating element 20 are integrally formed by insert molding.

Figure 5:
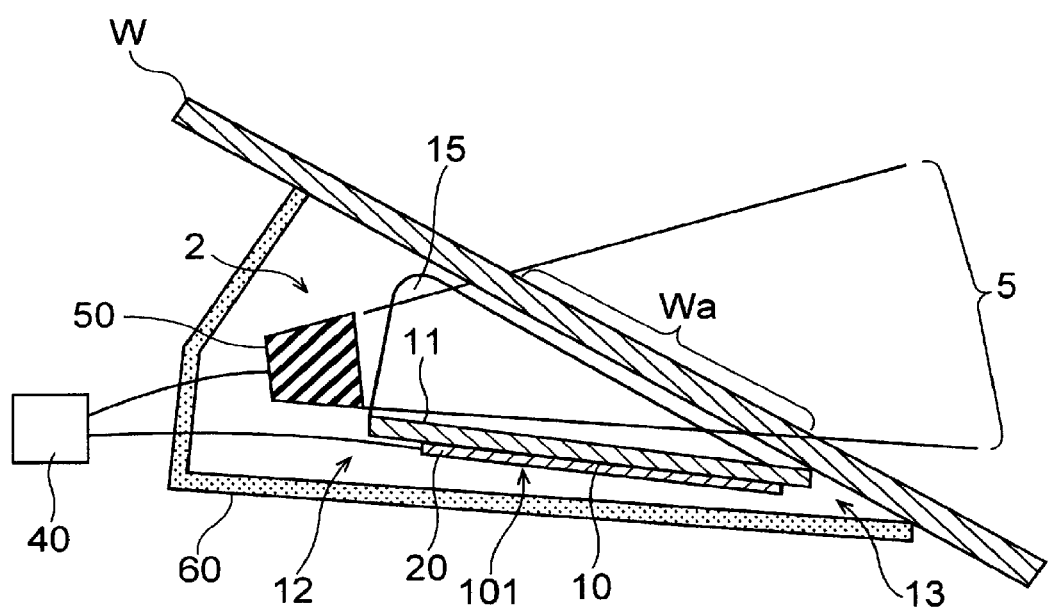
FIG. 5 is a schematic cross-sectional view of a heating device according to a modification example of the present invention and an in-vehicle camera device having the heating device. The in-vehicle camera device is mounted on the window glass inside the vehicle.

In the above embodiment, the heating element 20 is disposed on the upper surface of the hood 10, but the present invention is not limited to this example. For example, the heating element 20 may be disposed on the rear surface of the hood 10. FIG. 5 shows a heating device 101 configured as discussed above. FIG. 5 also shows an in-vehicle camera device 2 having the heating device 101. In the example shown in FIG. 5, an antireflection film for preventing the heat element 20 from being reflected on the window glass portion Wa is unnecessary. Therefore, the structure of the heating device 100 can be further simplified.

Figure 6:
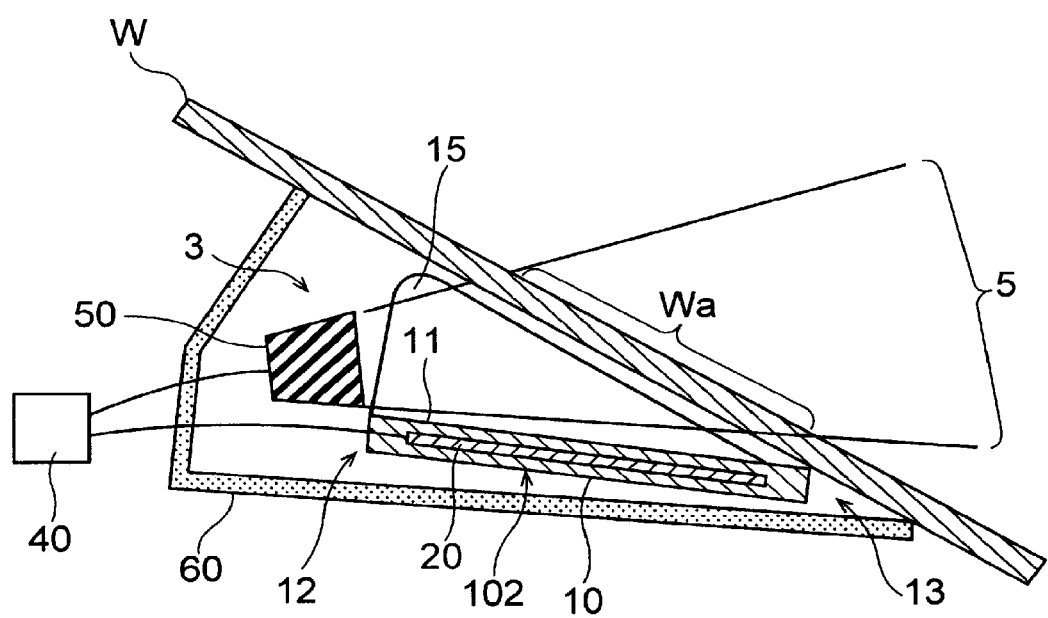
FIG. 6 is a schematic cross-sectional view of a heating device according to a further modification example of the present invention and an in-vehicle camera device having the heating device. The in-vehicle camera device is mounted on the window glass inside the vehicle.

Alternatively, the heating element 20 may be disposed inside the hood 10. FIG. 6 shows a heating device 102 configured as discussed above. FIG. 6 also shows an in-vehicle camera device 3 having the heating device 102. In the example shown in FIG. 6, a desired temperature of the heating element 20 is lower than that in the case where the heating element 20 is disposed on the lower surface of the hood. Therefore, the heating efficiency is relatively high. Further, also in this case, an antireflection film for preventing the heat element 20 from being reflected on the window glass portion Wa is unnecessary.

In the above description, the in-vehicle camera 50 is assumed as the off-vehicle information acquisition means. However, the present invention is not limited to this example. For example, an in-vehicle radar may be employed as the vehicle information acquisition means. In this case, the off-vehicle information acquisition means includes an electromagnetic wave transmitter and a receiver receiving the reflected wave. The electromagnetic wave transmitter and the receiver constitute the in-vehicle radar. In this case, the information acquisition path of the off-vehicle information acquisition means is both of the emission path of the electromagnetic wave and the incidence path of the reflected wave of the in-vehicle radar. In addition, an appropriate device having a function of acquiring off-vehicle information can be adopted. The off-vehicle information includes various kinds of information such as the distance to a moving object (such as a pedestrian, a bicycle, or a vehicle) and a fixed object (such as a guardrail or a building) existing around own vehicle, the dimensions of the moving object and the fixed object, and the relative speed to own vehicle.

REFERENCE SIGNS LIST

1 In-Vehicle Camera Device
5 Viewing field
10 Hood
11 Upper Surface
12 Base End
13 Tip End
14 15 Side Wall
20 Heating Element
21 Heater Layer
22 Film Substrate
30 Low Reflection Film
40 Control Unit
50 In-Vehicle Camera
60 Support Body
100 Heating Device

The invention claimed is:

1. A heating device arranged inside a vehicle and heating a window glass portion, the window glass portion being located in an information acquisition path of an off-vehicle information acquisition sensor acquiring information outside the vehicle, the heating device comprising:
   a hood provided inside the vehicle below the information acquisition path of the off-vehicle information acquisition sensor; and
   a heating element provided on a surface of the hood or inside the hood and having a PTC heater, wherein
   the hood has an upper surface facing the window glass portion,
   the heating element is provided on the upper surface of the hood,
   the hood or the heating device has side walls that shield a light incident from sides of the hood toward the window glass portion, and
   the heating device further comprising a low reflection film provided on the upper surface of the hood so as to cover the heating element.

2. The heating device according to claim 1, wherein a color of the low reflection film is black.

3. The heating device according to claim 1, wherein
   the heating element comprises a film substrate and a PTC heater layer laminated on the film substrate, and
   the PTC heater layer comprises a polymer and conductive particles dispersed in the polymer.

4. The heating device according to claim 1, wherein the off-vehicle information acquisition sensor is an in-vehicle camera or an in-vehicle radar.

5. An off-vehicle information acquisition device, comprising:
   the heating device according to claim 1, and
   an off-vehicle information acquisition sensor provided on the heating device.

* * * * *